United States Patent

Ogata

[11] Patent Number: 5,173,806
[45] Date of Patent: Dec. 22, 1992

[54] KEPLERIAN VARIABLE MAGNIFICATION VIEWFINDER

[75] Inventor: Yasuzi Ogata, Tokyo, Japan

[73] Assignee: Olympus Optical Co., Ltd., Tokyo, Japan

[21] Appl. No.: 653,407

[22] Filed: Feb. 8, 1991

[30] Foreign Application Priority Data

Feb. 9, 1990 [JP] Japan .................................. 2-28357

[51] Int. Cl.$^5$ ........................................... G02B 15/14
[52] U.S. Cl. .................................... 359/683; 359/686
[58] Field of Search ................. 359/642, 683, 686, 689

[56] References Cited

U.S. PATENT DOCUMENTS

| | | | |
|---|---|---|---|
| 4,054,371 | 10/1977 | Yasukuni | 359/686 |
| 4,527,867 | 7/1985 | Fujioka et al. | 359/683 |
| 4,653,873 | 3/1987 | Kawamura | 359/686 |
| 4,757,336 | 7/1988 | Nakayama et al. | 359/689 |
| 4,846,562 | 7/1989 | Tokumaru et al. | 359/686 |
| 5,062,695 | 11/1991 | Iwasaki | 359/683 |

FOREIGN PATENT DOCUMENTS

| | | |
|---|---|---|
| 61-156018 | 7/1986 | Japan . |
| 61-156019 | 7/1986 | Japan . |
| 64-65519 | 3/1989 | Japan . |
| 1-131510 | 5/1989 | Japan . |
| 1-257817 | 10/1989 | Japan . |

*Primary Examiner*—Constantine Hannaher
*Assistant Examiner*—Richard Hanig
*Attorney, Agent, or Firm*—Cushman, Darby & Cushman

[57] ABSTRACT

A variable magnification viewfinder comprising, in the order from the object side, an objective lens system having a positive refractive power, a field lens component having a positive refractive power and an eyepiece lens system having a positive refractive power; said objective lens system comprising a first lens unit having a negative refractive power, a second lens unit having a positive refractive power and a third lens unit having a negative refractive power, and said variable magnification lens system being designed in such a manner that it performs variation of magnification and correction of diopter by moving said second lens unit and said third lens unit along the optical axis so as to vary the airspace reserved between these lens units with said first lens unit kept fixed on the optical axis.

The variable magnification viewfinder has a variable magnification ratio on the order of 2, a compact design and favorably corrected aberrations, and can be manufactured at a low cost in practice.

7 Claims, 21 Drawing Sheets

KEPLERIAN VARIABLE MAGNIFICATION VIEWFINDER

BACKGROUND OF THE INVENTION a) Field of the invention

The present invention relates to a variable magnification viewfinder to be used with photographic cameras, video cameras and so on.

b) Description of the prior art

The inverted Galilean finder is known as a viewfinder comprising an imaging lens system and a finder optical system which are designed as systems separate from each other. However, the inverted Galilean finder has defects that it cannot form a clear image of a frame of a visual field and that it allows observation of the visual field itself to be hindered due to the ghost and flare produced by a half mirror used for forming the image of the frame of the visual field.

In contrast, the Keplerian finder allows observation of a clear image of object since it is designed so as to allow observation of a real image formed by an objective lens system through an eyepiece lens system.

Further, as Keplerian finders having variable magnification functions, there are known a finder which is equipped with an objective lens system designed as a zoom lens system composed of two lens units and another finder which is equipped with an objective lens system designed as a zoom lens system composed of three lens units. The former type of conventional finder is exemplified by those disclosed by Japanese Patents Kokai Publication No. Sho 61-156018, Kokai Publication No. Sho 64-65519 and Kokai Publication No. Hei 1-257817, thereas the latter type of conventional finder is exemplified by that disclosed by Japanese Patent Kokai Publication No. Hei 1-131510.

However, each of the above-mentioned conventional examples is undesirable since it uses an objective lens system having a long total length and enlarges a camera when the finder is assembled with the camera.

In addition, as a further example of the conventional finder comprising an objective lens system composed of two lens units, there is known the finder disclosed by Japanese Patent Kokai Publication No. Sho 61-156019. The objective lens system of this conventional example is composed of a positive lens unit and a negative lens unit, and has a short total length, but requires a high manufacturing cost since it uses glass materials having high refractive indices for correcting aberrations favorably.

SUMMARY OF THE INVENTION

A primary object of the present invention is to provide a compact Keplerian variable magnification viewfinder which has a variable magnification ratio on the order of 2 and favorably corrects aberrations, uses an objective lens system shortened in the total length thereof, and can be manufactured at a reduced cost by reducing the number of the lens elements to be arranged therein and fabricating most of the lens elements from plastic materials.

As illustrated in FIG. 21 which visualizes the concept of the present invention, the variable magnification viewfinder according to the present invention comprises, in the order from the object side, an objective lens system O having a positive refractive power, a field lens component F having a positive refractive power and an eyepiece lens system E having a positive refractive power, said objective lens system O comprising a first lens unit $G_1$ having a negative refractive power, a second lens unit $G_2$ having a positive refractive power and a third lens unit $G_3$ having a negative refractive power. The variable magnification viewfinder according to the present invention is adapted in such a manner that it performs variation of magnification of the lens system and correction of diopter thereof by moving said second lens unit $G_2$ and said third lens unit $G_3$ along the optical axis so as to vary the airspace reserved between these lens units with said first lens unit kept fixed. The variable magnification viewfinder according to the present invention is a Keplerian finder which is designed so as to allow observation of a real image formed in the vicinity of a field lens component F by an objective lens system O through an eyepiece lens system E which is composed of an optical element P for forming an erect image and a magnifying lens component L having a positive refractive power.

It is desirable for the finder according to the present invention described above to use, in the second lens unit $G_2$, at least one aspherical surface having positive refractive power progressively weakened in the radial direction as the surface portions are farther from the optical axis and, in the third lens unit $G_3$, at least one aspherical surface having positive refractive power progressively weakened in the radial direction as the surface portions are farther from the optical axis. The finder according to the present invention is characterized in that it comprises the second lens unit $G_2$ which uses at least one aspherical surface having the positive refractive power progressively weakened in the radial direction as the surface portions are farther from the optical axis and has a positive refractive power as a whole, and the third lens unit $G_3$ which uses at least one aspherical surface having the positive refractive power progressively weakened in the radial direction as the surface portions are farther from the optical axis and has a negative refractive power as a whole, and that it performs variation of magnification and correction of diopter by moving said second lens unit $G_2$ and said third lens unit $G_3$ along the optical axis with said first lens unit $G_1$ kept fixed. Further, the finder according to the present invention is designed as the Keplerian finder which allows observation of a real image formed in the vicinity of the field lens F by the objective lens system O through the eyepiece lens system E which is composed the an optical element P for forming an erect image and the magnifying lens component L having a positive refractive power.

As is well known in the field of designs of photographic lens systems, it is general for shortening a total length of a zoom lens system to compose it of a positive lens unit and a negative lens unit. When this zoom lens system is used as an objective lens system for a finder, back focal length of the objective lens system is extremely shortened and a space for arranging a field lens cannot be reserved in the finder, thereby inevitably enlarging the eyepiece lens system to be used therewith and complicating the compositions thereof. When the objective lens system is designed so as to have an unreasonably long back focal length, it will be obliged to use an increased number of lens elements and expensive materials for correcting aberrations in the objective lens system.

In the finder according to the present invention, the objective lens system is designed as a zoom lens system composed of three lens units by adding a negative lens unit to the object side of the zoom lens system composed of the two lens units so as to prolong the back focal length, and the additional negative lens unit is kept fixed during zooming for preventing the mechanism for moving the lens units from being complicated. Speaking more concretely, the finder according to the present invention adopts the objective lens system O which is designed as a zoom lens system having a fundamental composition comprising, in the order from the object side, the first lens unit $G_1$ having the negative refractive power, the second lens unit $G_2$ having the positive refractive power and the third lens unit $G_3$ having the negative refractive power for obtaining the required back focal length, and uses at least one aspherical surface having positive refractive power progressively weakened in the radial direction as the surface portions are farther from the optical axis in each of the second lens unit $G_2$ and the third lens unit $G_3$ for shortening the total length and improving the optical performance of the objective lens system.

In order to obtain a finder having more excellent optical performance at a low cost, it is desirable to design the objective lens system so as to satisfy the following conditions (1), (2) and (3):

| (1) | $1.0 < |f_1/f_W| < 5.0$ |
| (2) | $0.6 < f_2/f_W < 1.2$ |
| (3) | $0.2 < |\beta_{2W} \cdot \beta_{3W}| < 1.0$ | wherein the reference symbols $f_1$ and $f_2$ represent the focal length of the first lens unit $G_1$ and that of the second lens unit $G_2$, the reference symbol $f_W$ designates the focal length of the objective lens system as a whole at the wide position, and the reference symbols $\beta_{2W}$ and $\beta_{3W}$ denote the imaging magnifications of the second lens unit $G_2$ and the third lens unit $G_4$ respectively at the wide position.

Out of the conditions mentioned above, the condition (1) and the condition (3) relate to the back focal length of the objective lens system.

If the upper limit of the condition (1) or the lower limit of the condition (3) is exceeded, it will be difficult to obtain the required back focal length. If the lower limit of the condition (1) or the upper limit of the condition (3) is exceeded, it will be possible to obtain the required back focal length, but it will be necessary to increase the number of the lens elements composing the objective lens system and/or use glass materials having high refractive indices, thereby producing a disadvantage from the viewpoint of manufacturing in practice.

The condition (2) relates to the total length of the objective lens system. If the upper limit of the condition (2) is exceeded, the movable lens units must be displaced for a long distance for variation of magnification, thereby prolonging the total length of the objective lens system. If the lower limit of the condition (2) is exceeded, in contrast, an advantage will be obtained for shortening the total length of the objective lens system, but it will be difficult to correct aberrations without increasing the number of lens elements and/or using glass materials having high refractive indices for composing the objective lens system, thereby producing a disadvantage from the viewpoint of manufacturing in practice.

Furthermore, it is desirable for the objective lens system of the finder according to the present invention to compose the lens units thereof as described below.

Speaking concretely, it is preferable that the first lens unit $G_1$ is composed of a single negative lens element, that the second lens unit $G_2$ is composed of at least one positive lens element, and that the third lens unit $G_3$ is composed of a single negative lens element.

DETAILED DESCRIPTION OF THE PREFERRED EMBODIMENTS

Figure 1:
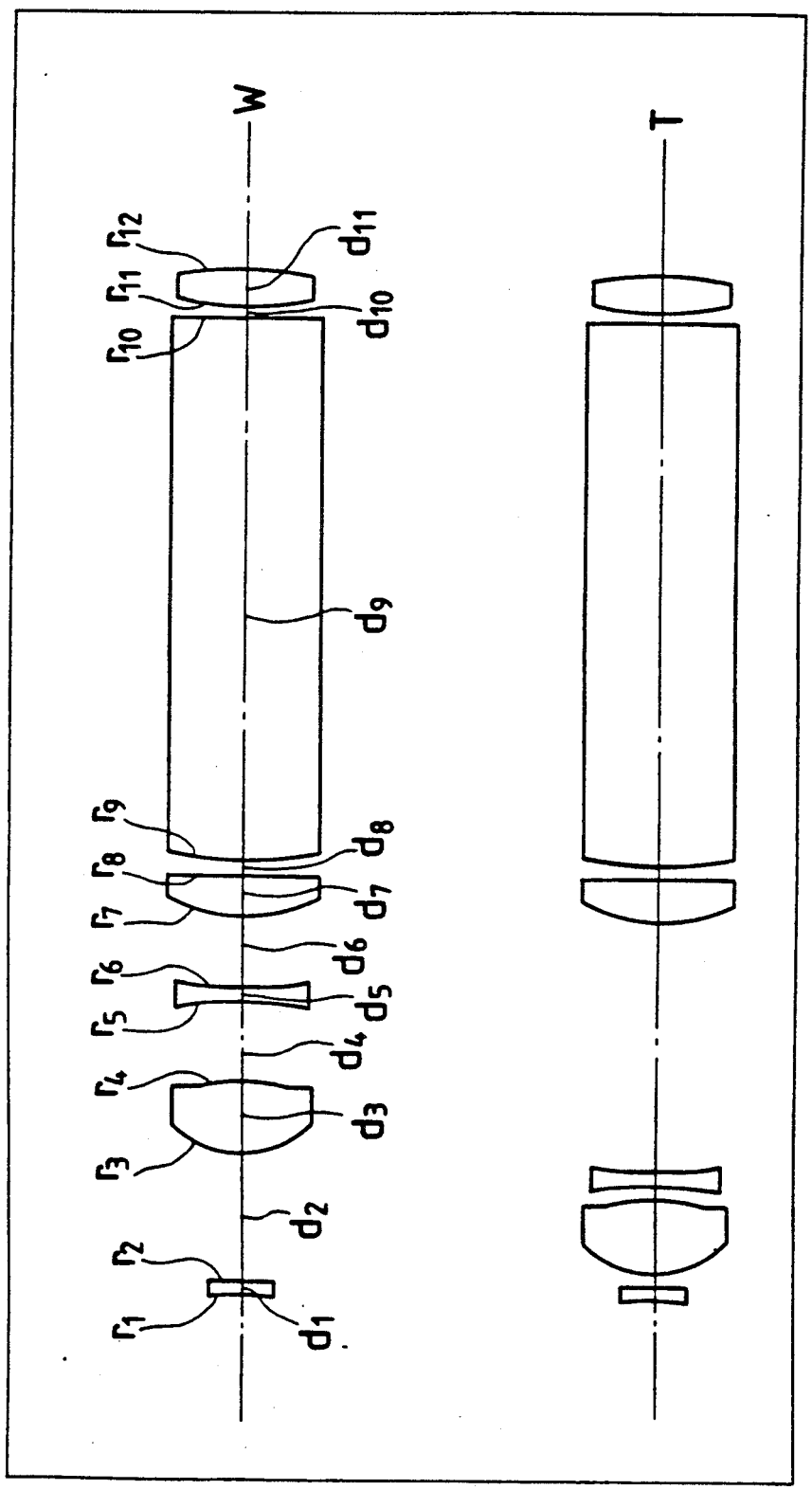
FIG. 1 through FIG. 5 show sectional views illustrating compositions of Embodiments 1 through 5 of the objective lens system for the finder according to the present invention.
Figure 2:
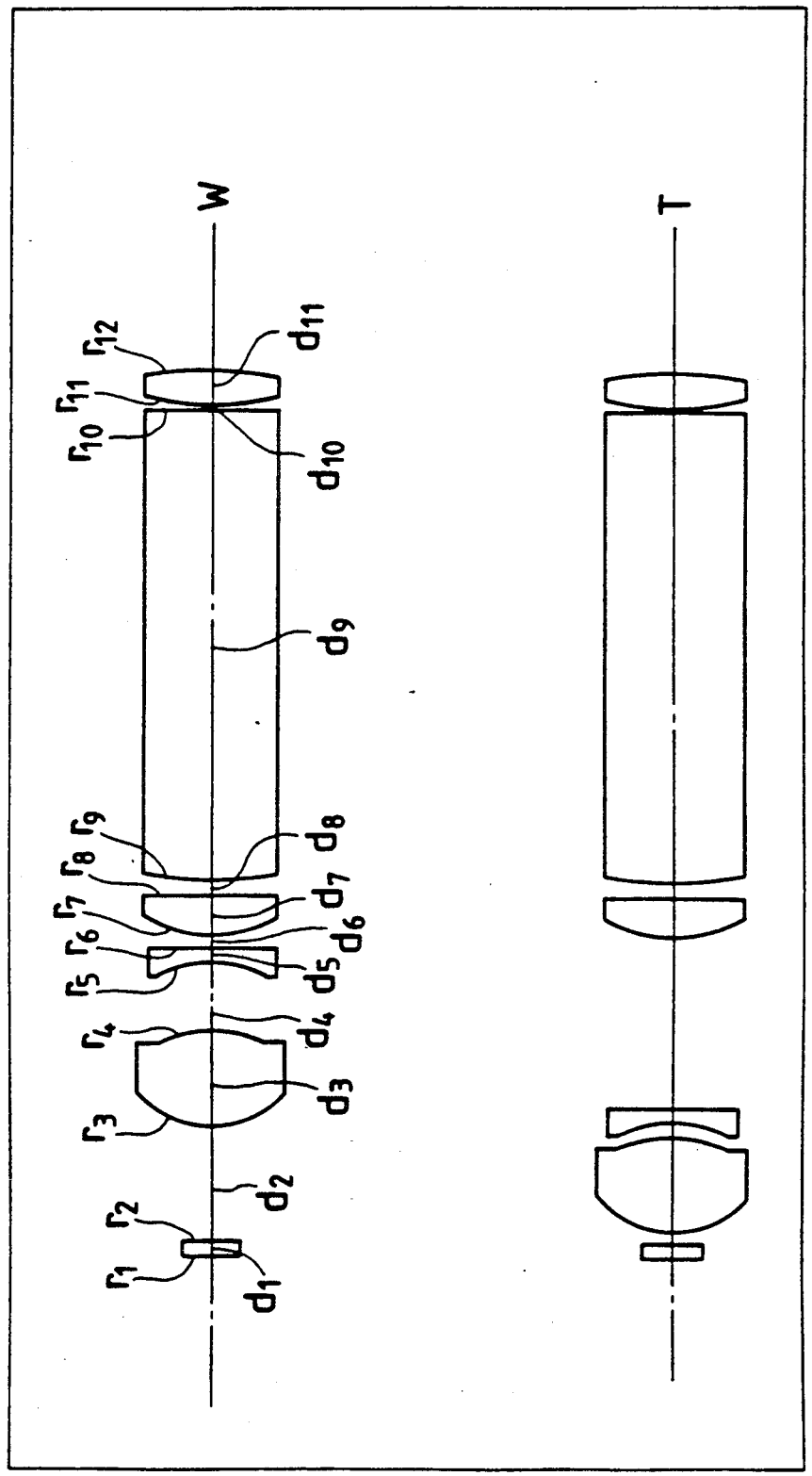
Figure 3:
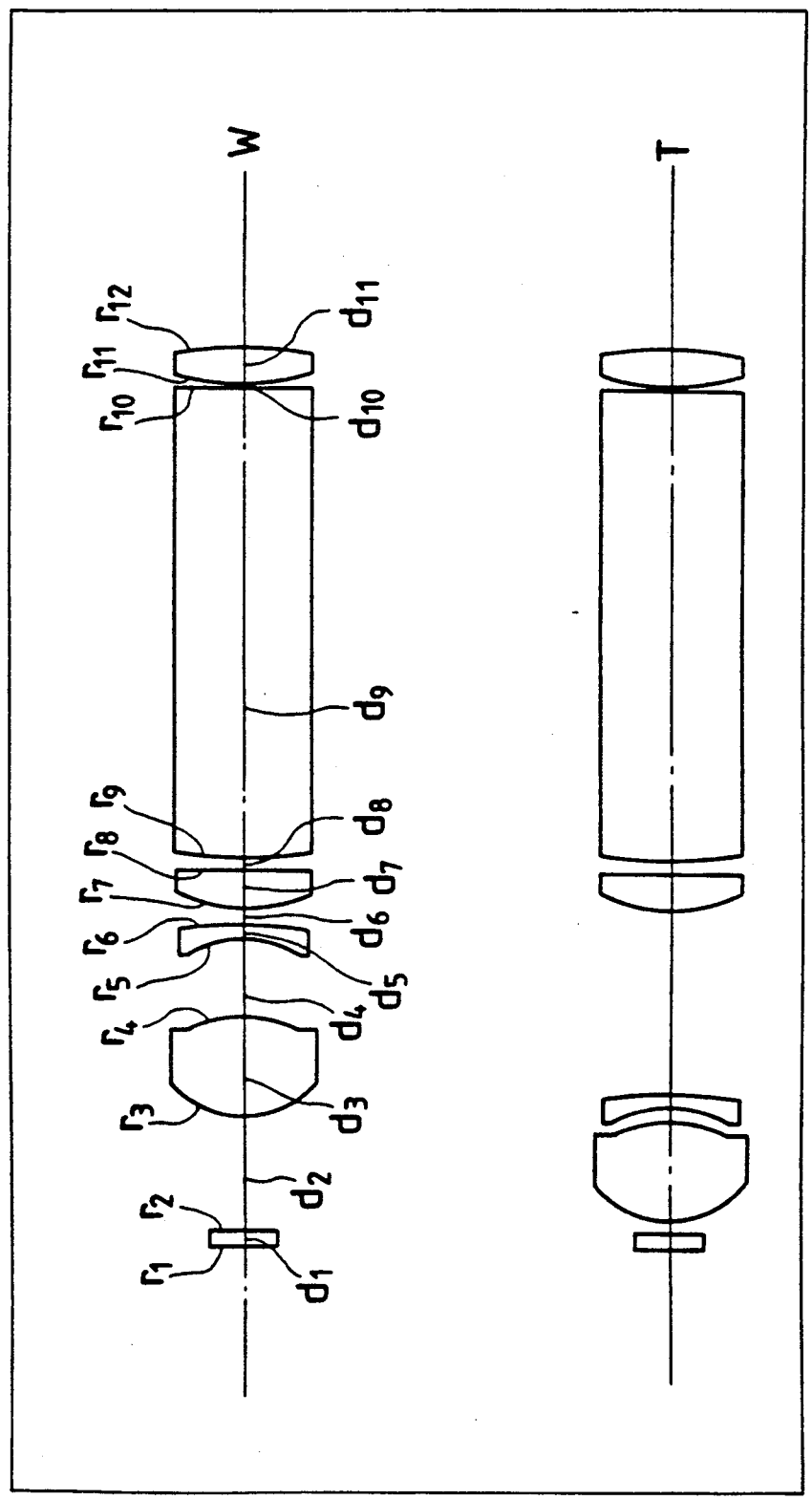
Figure 4:
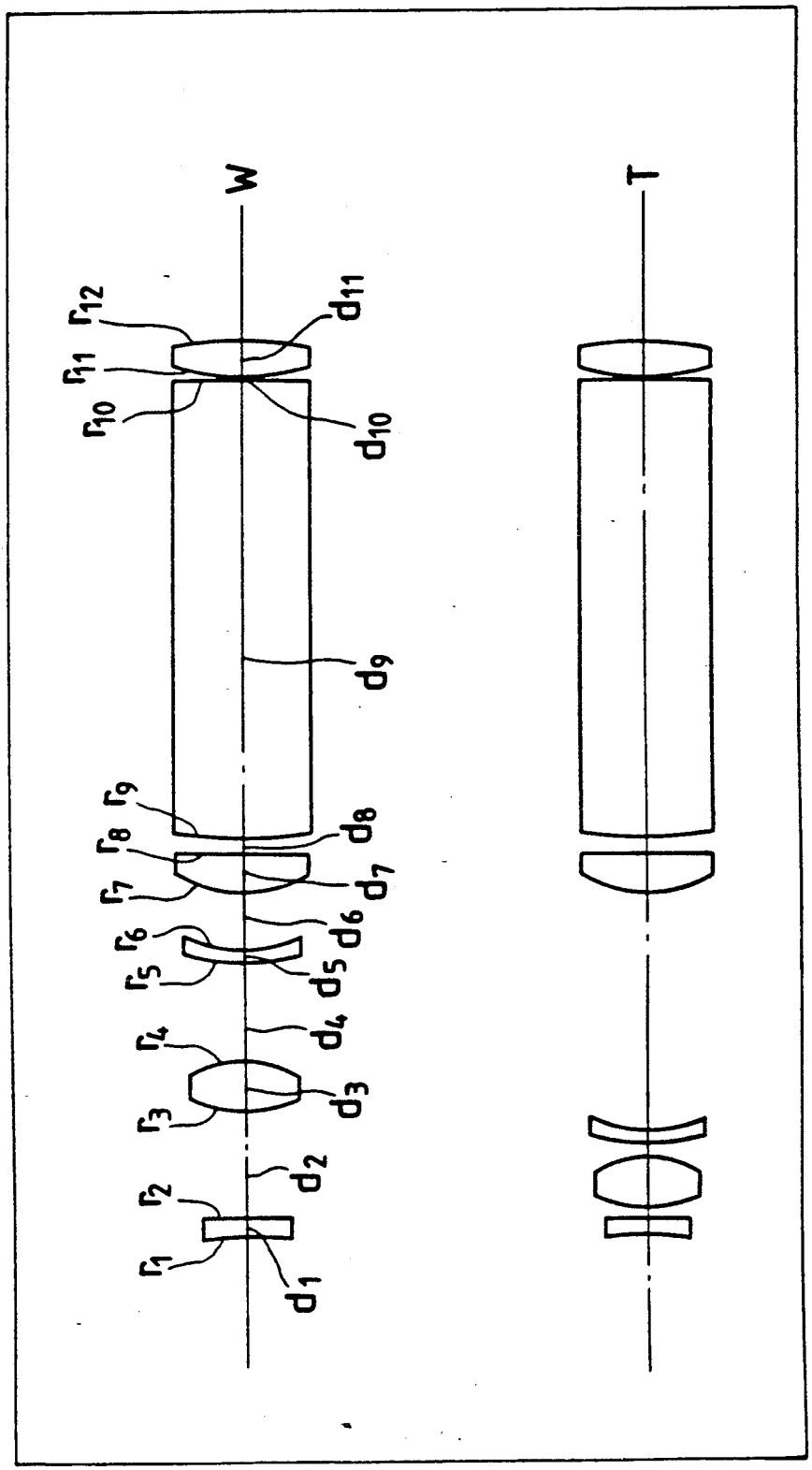
Figure 5:
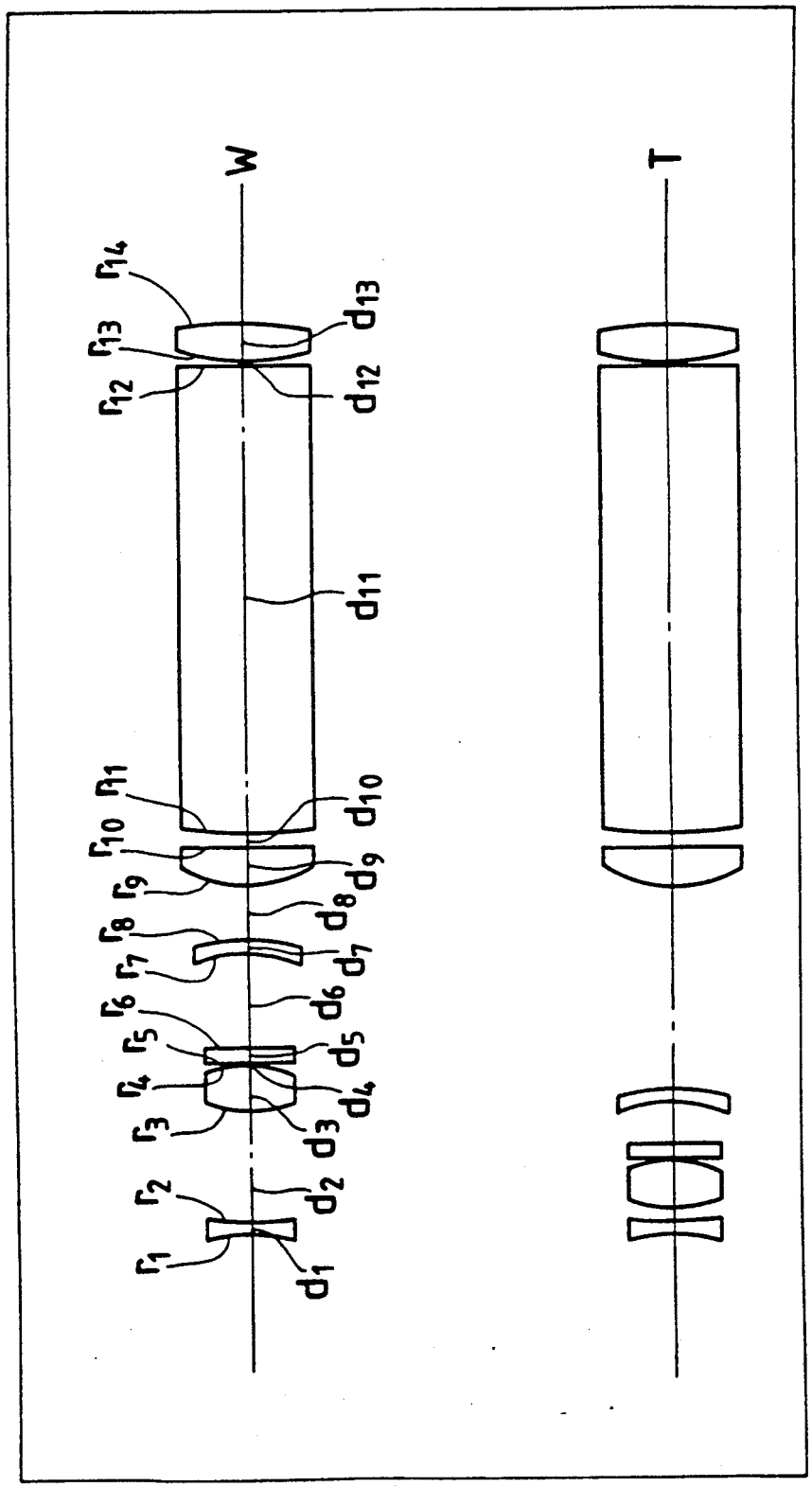
Figure 6:
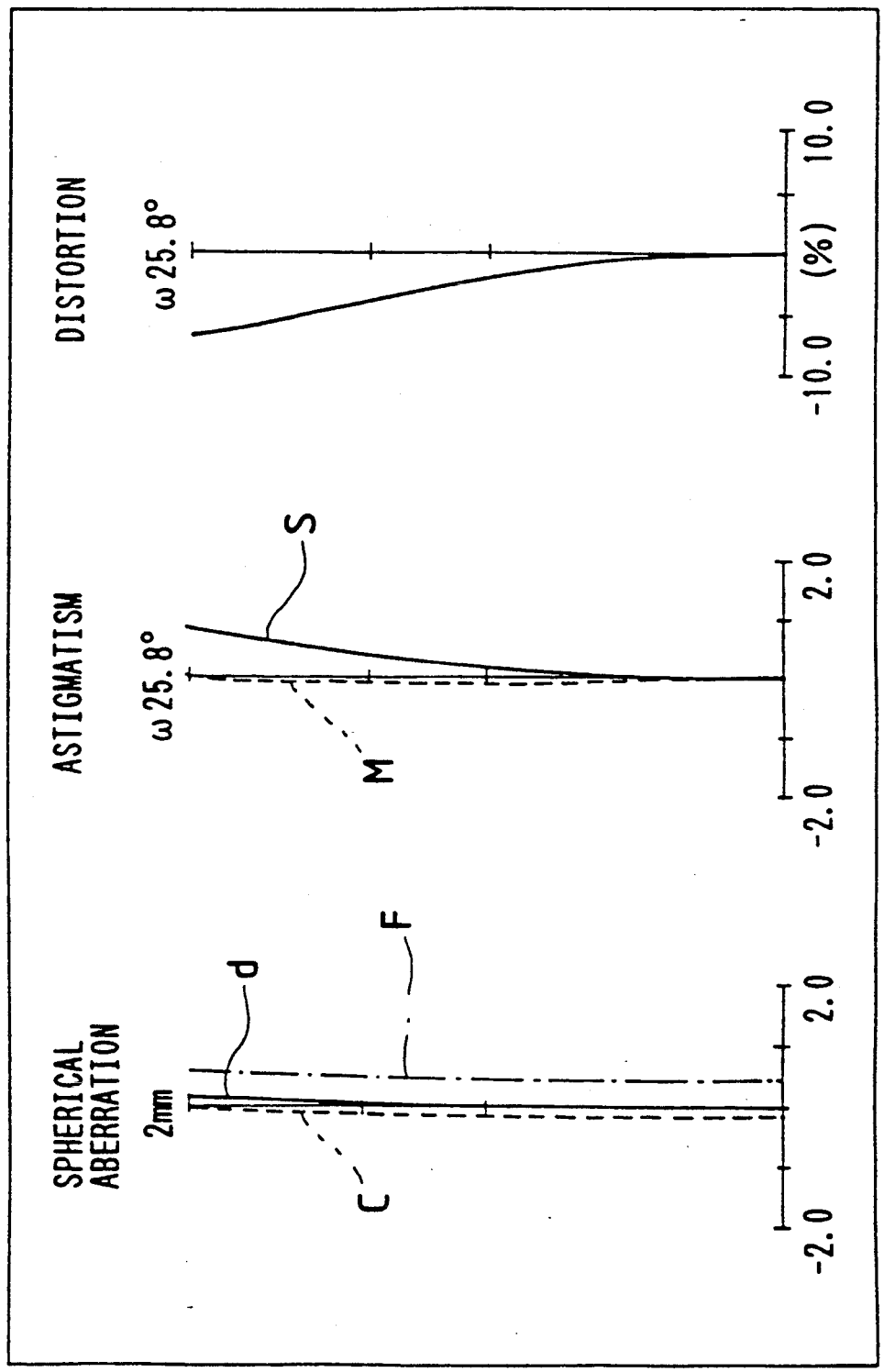
FIG. 6, FIG. 7 and FIG. 8 show graphs illustrating aberration characteristics at the wide position, intermediate magnification and tele position of the Embodiment 1 of the present invention.
Figure 7:
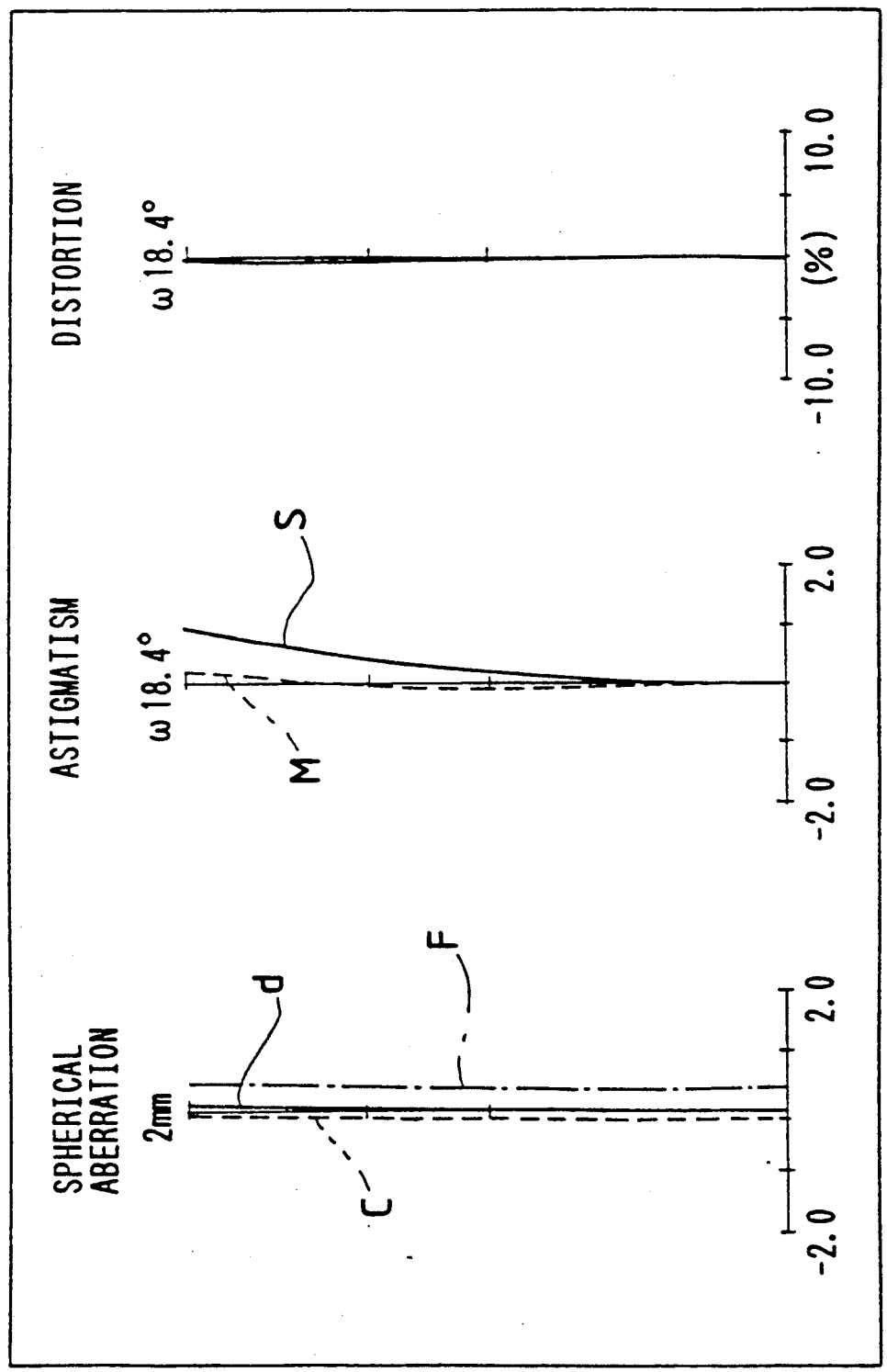
Figure 8:
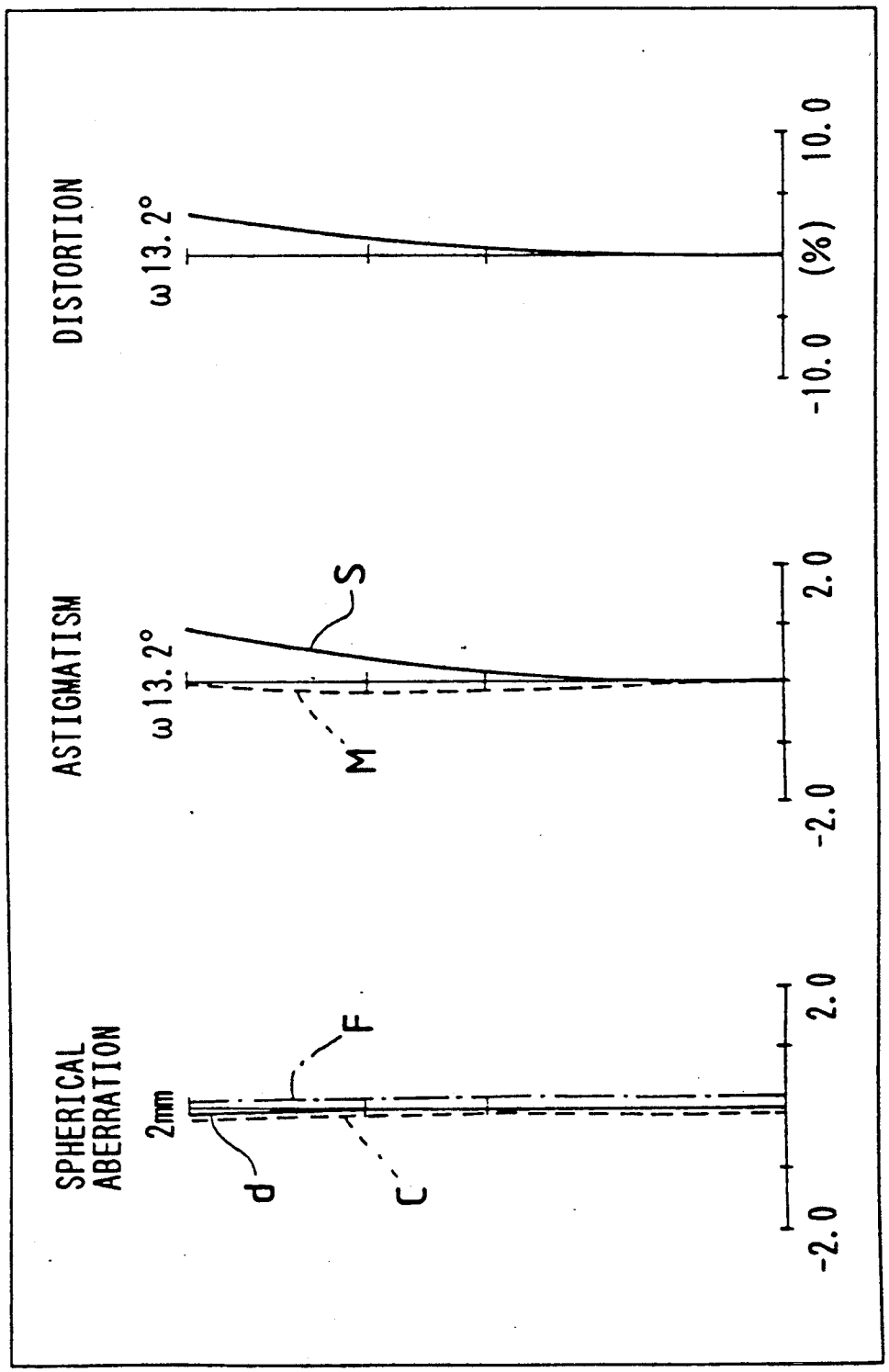
Figure 9:
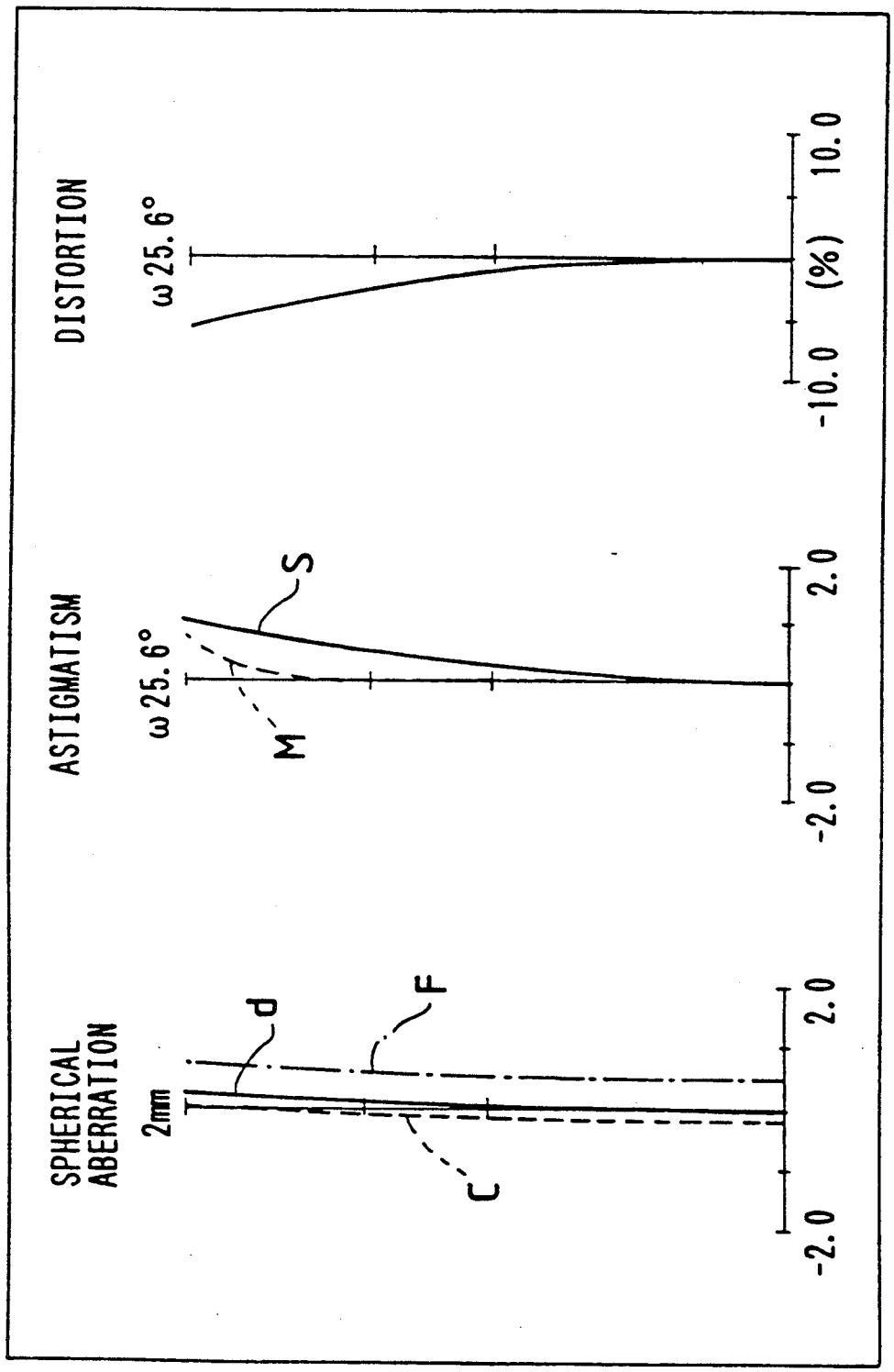
FIG. 9, FIG. 10 and FIG. 11 show graphs illustrating aberration characteristics at the wide position, intermediate magnification and tele position of the Embodiment 2 of the present invention.
Figure 10:
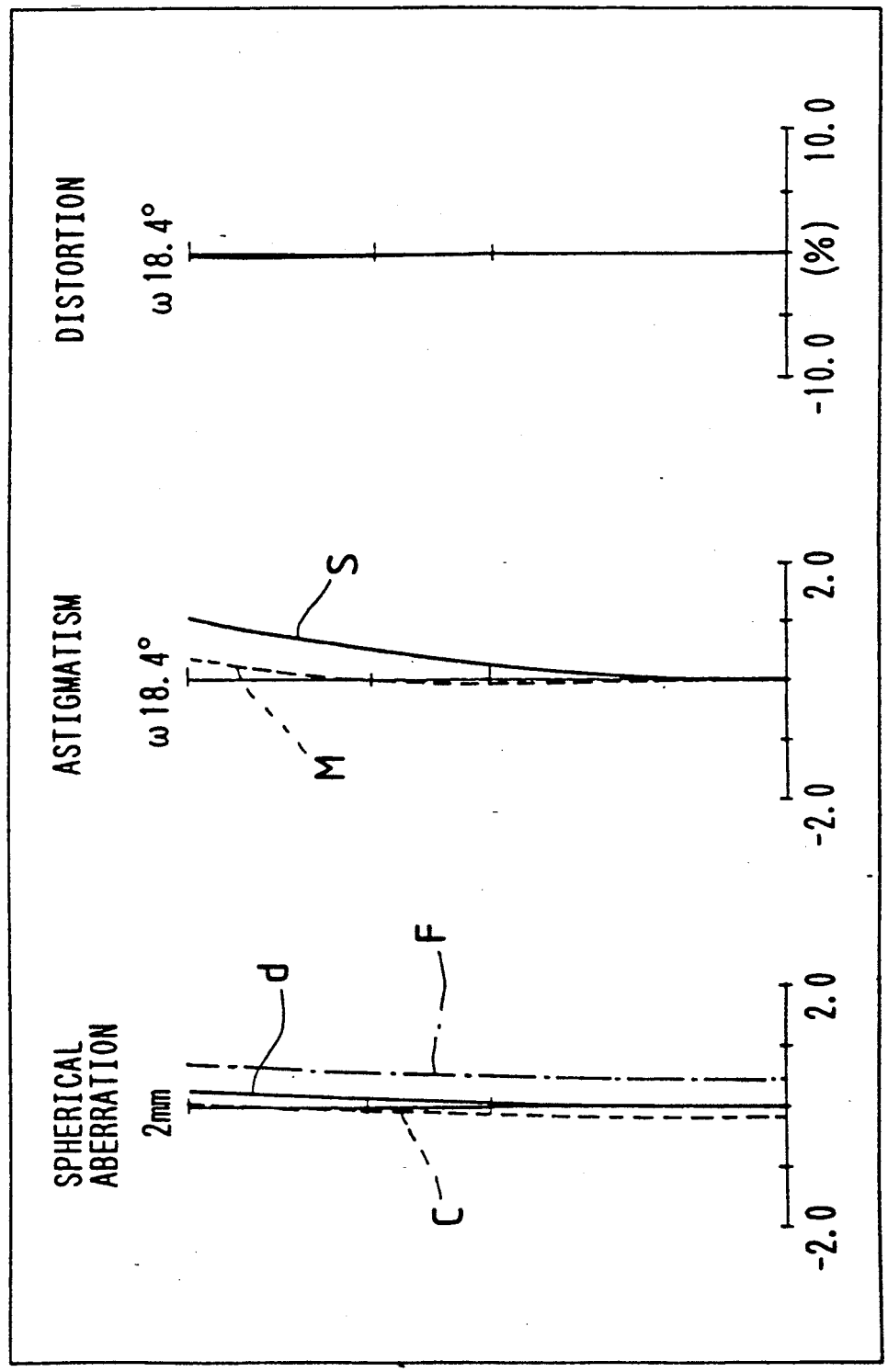
Figure 11:
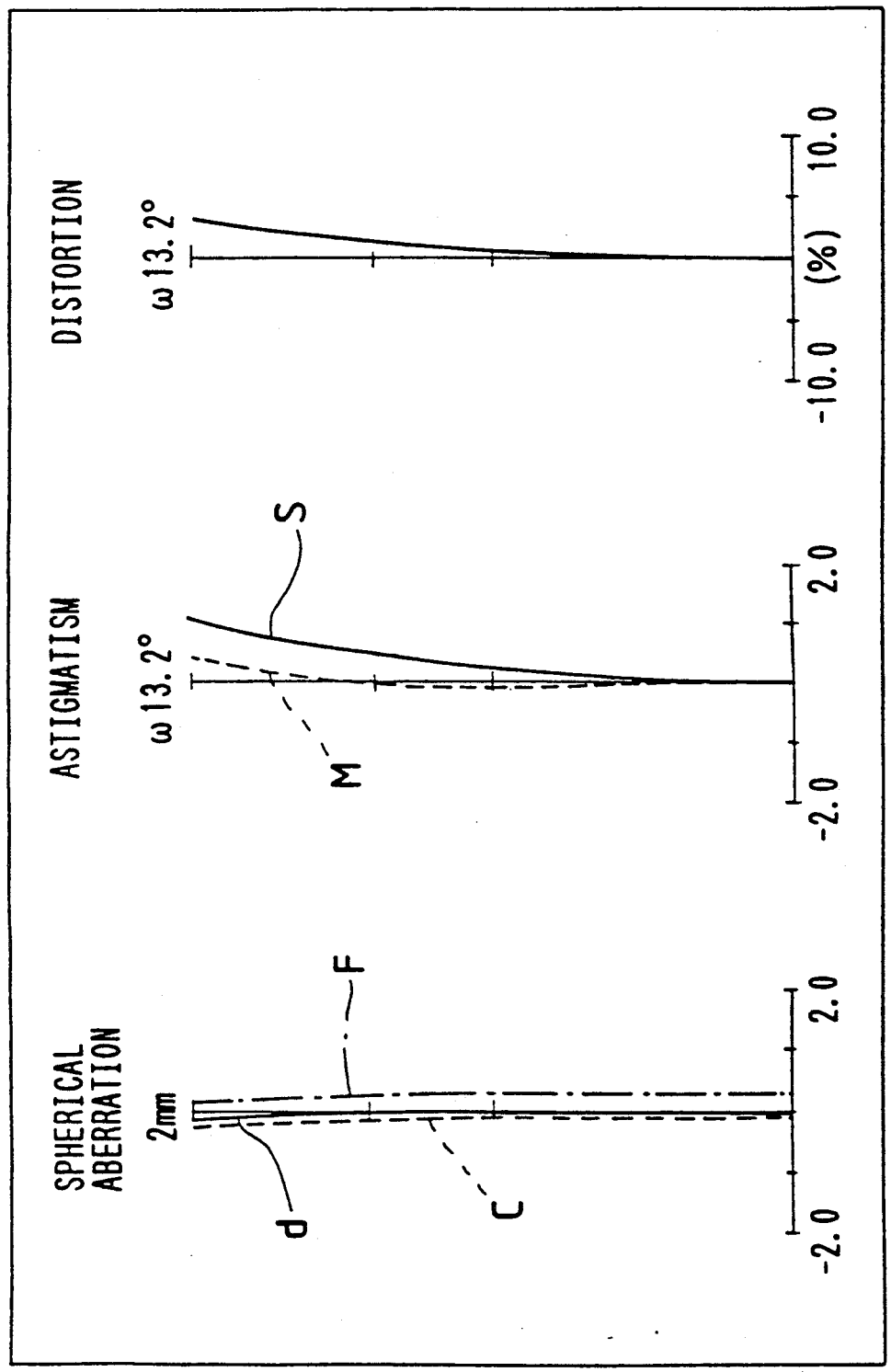
Figure 12:
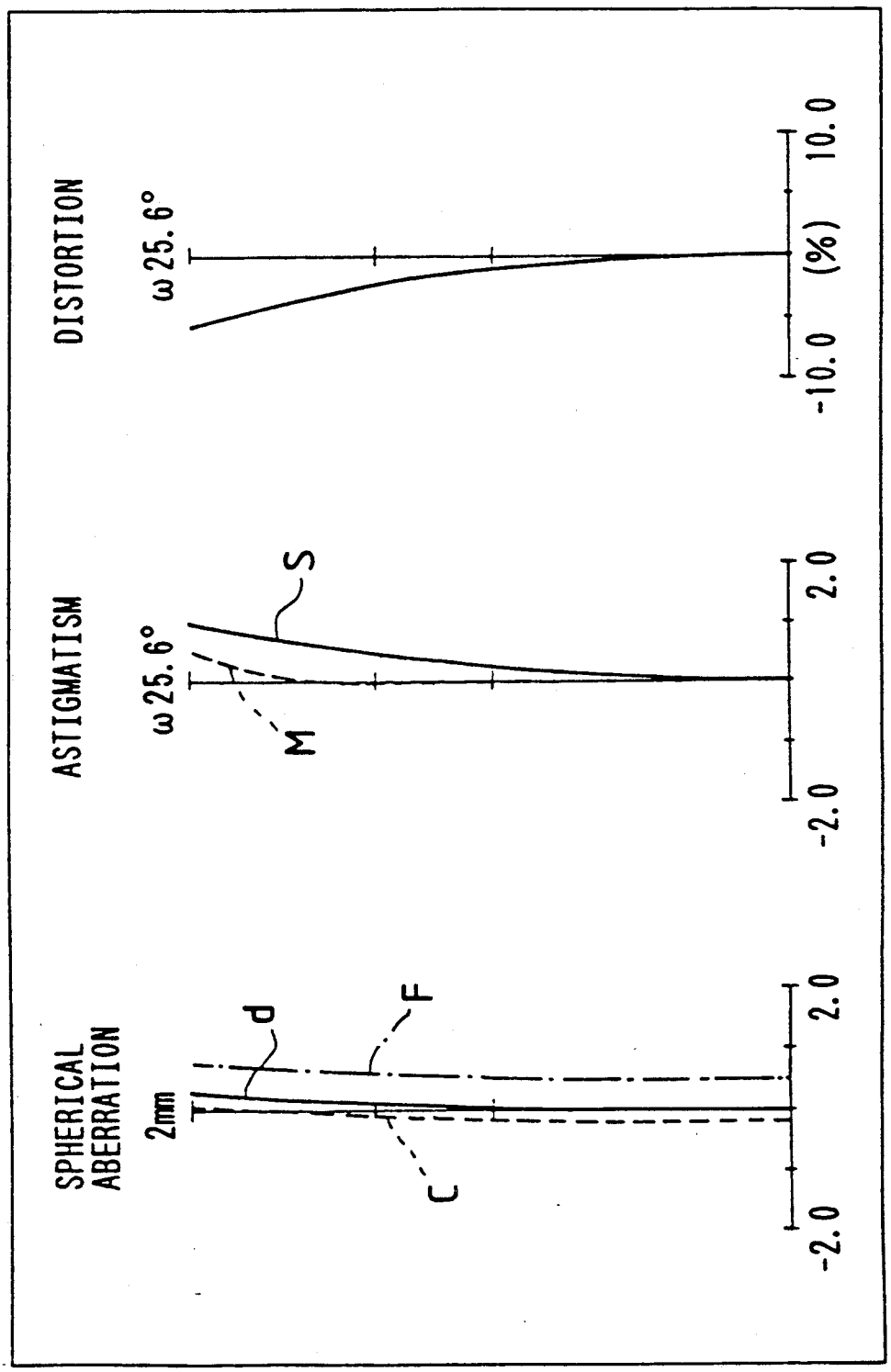
FIG. 12, FIG. 13 and FIG. 14 show curves visualizing aberration characteristics of the Embodiment 3 of the present invention.
Figure 13:
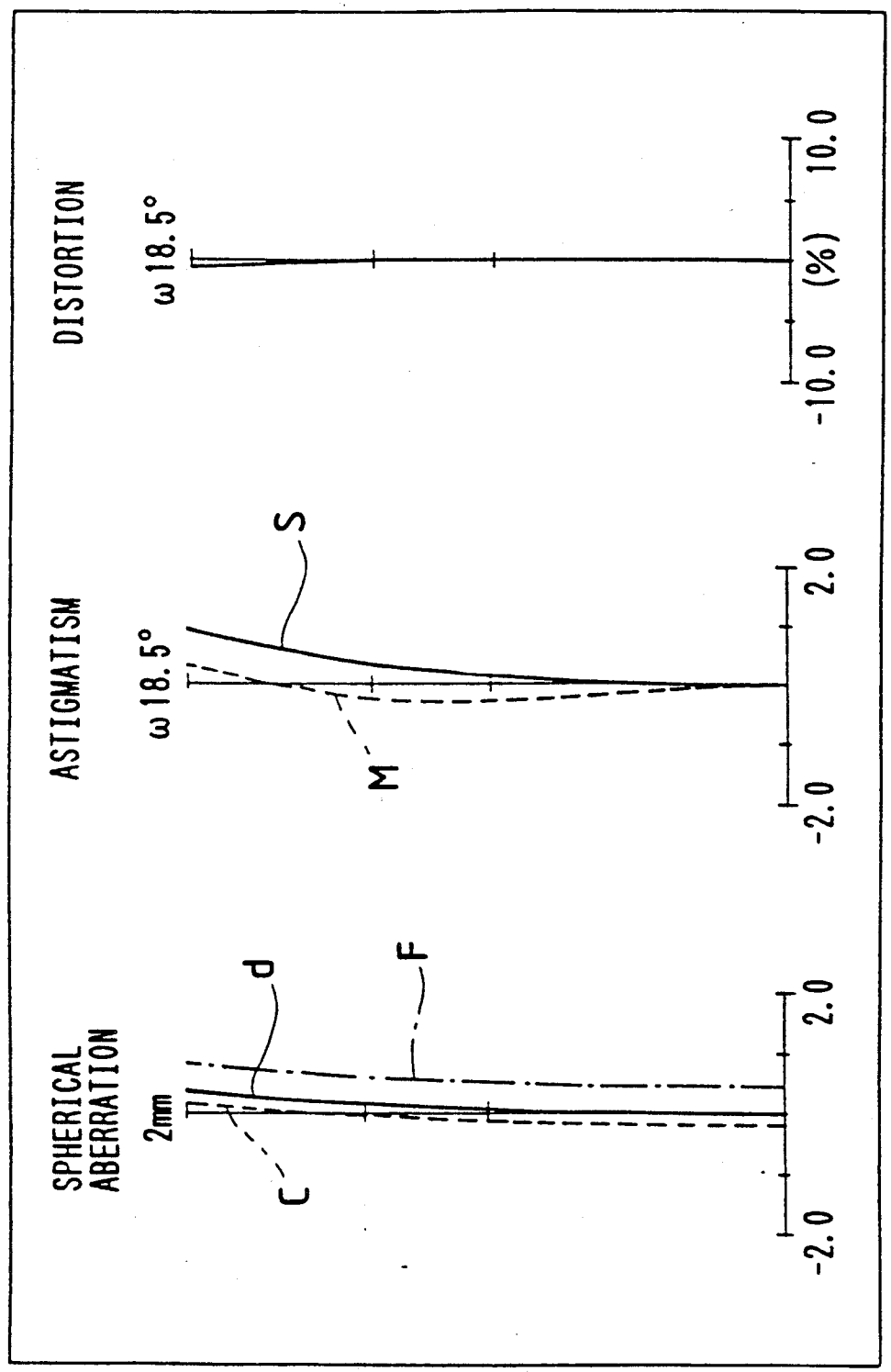
Figure 14:
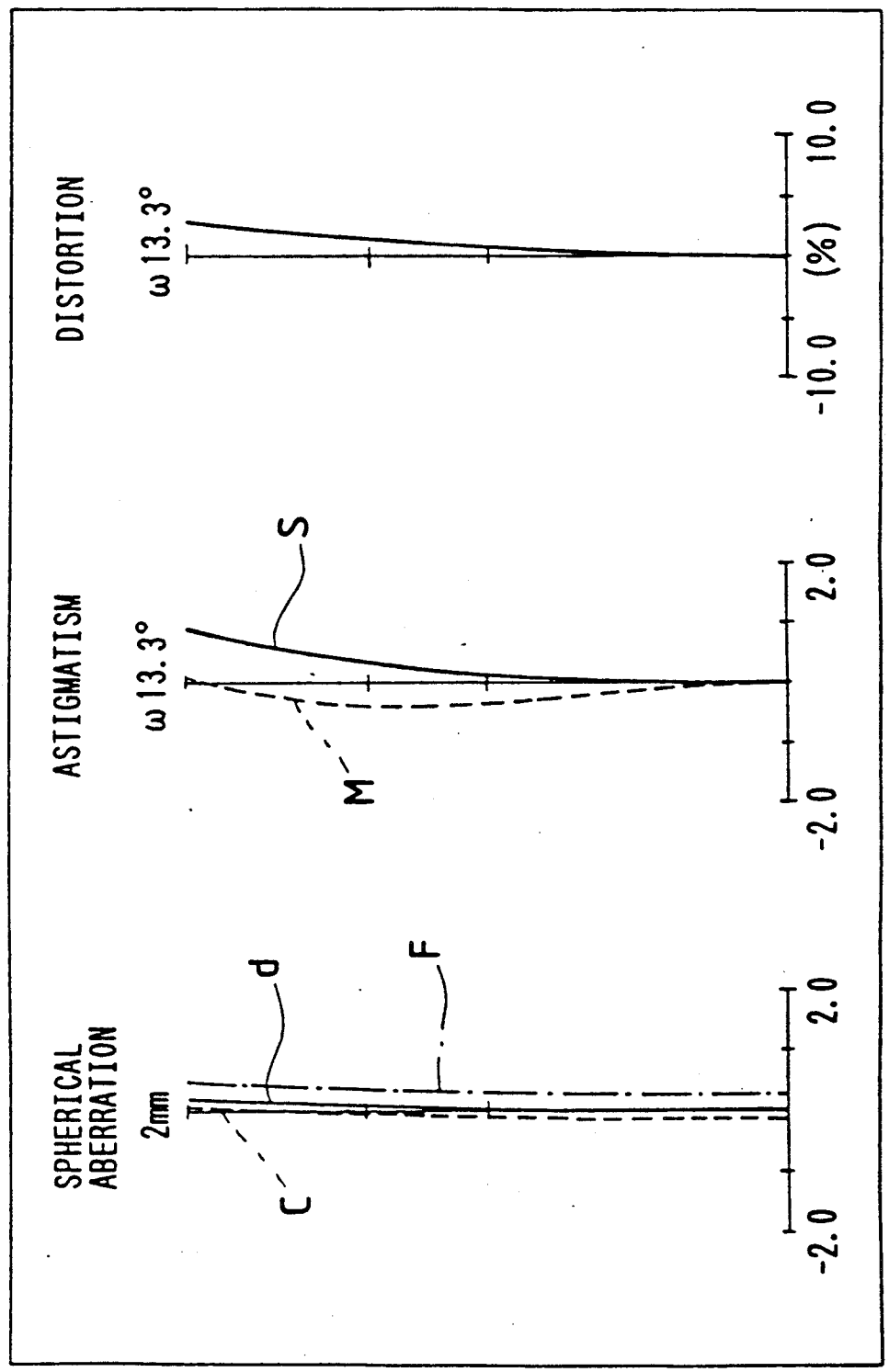
Figure 15:
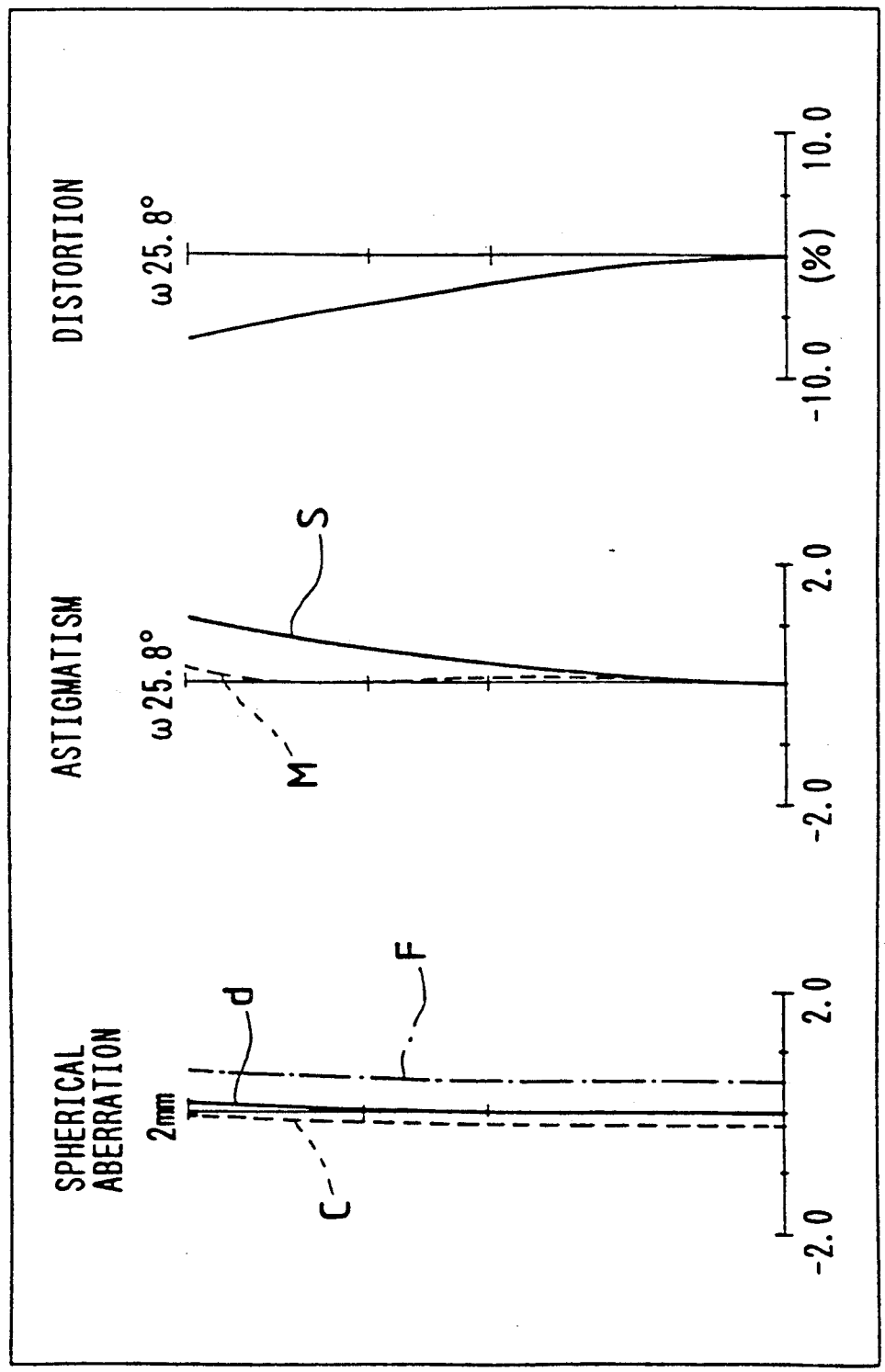
FIG. 15, FIG. 16 and FIG. 17 show curves visualizing aberration characteristics at the wide position, intermediate magnificent and tele position of the Embodiment 4 of the present invention.
Figure 16:
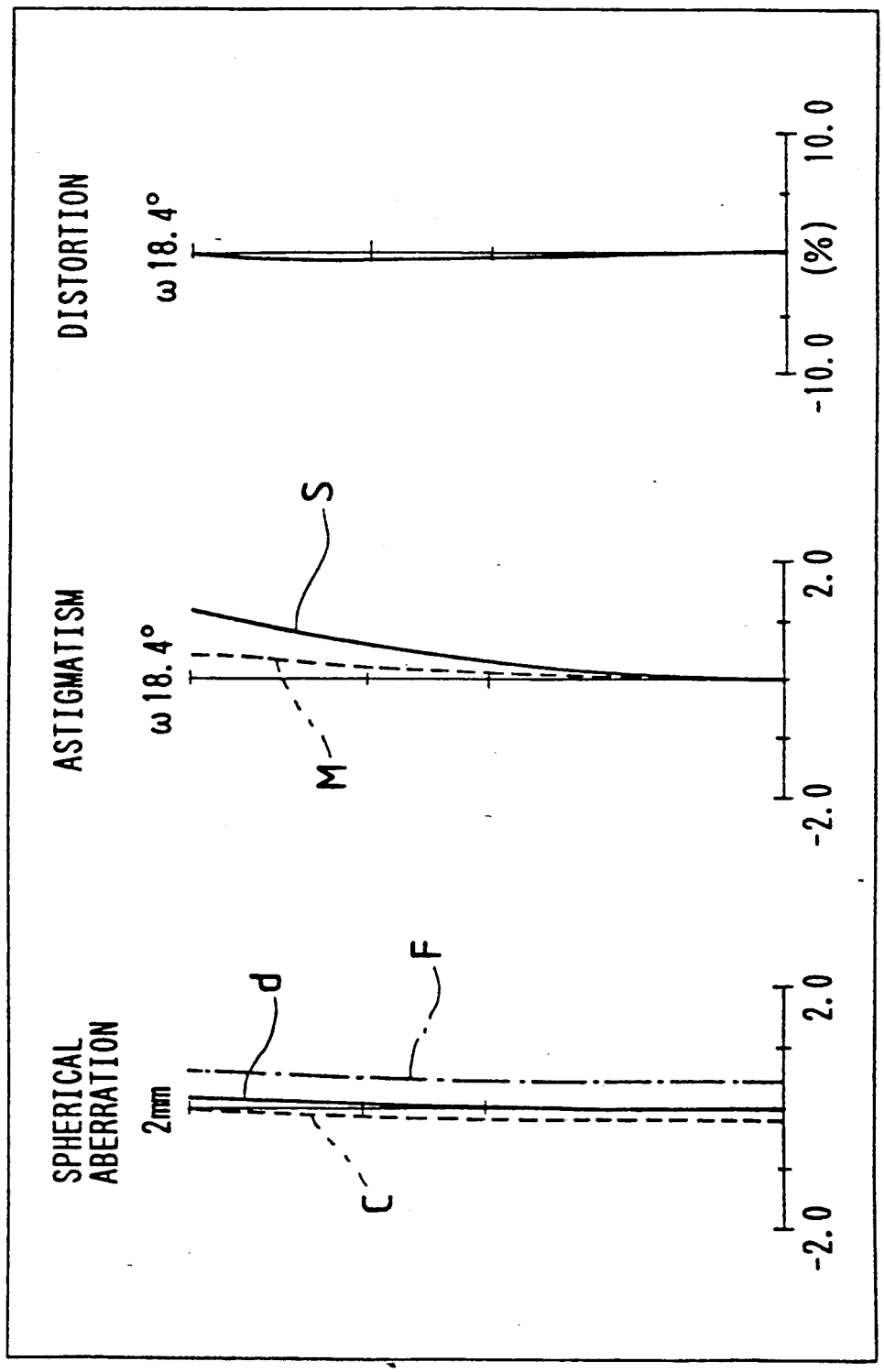
Figure 17:
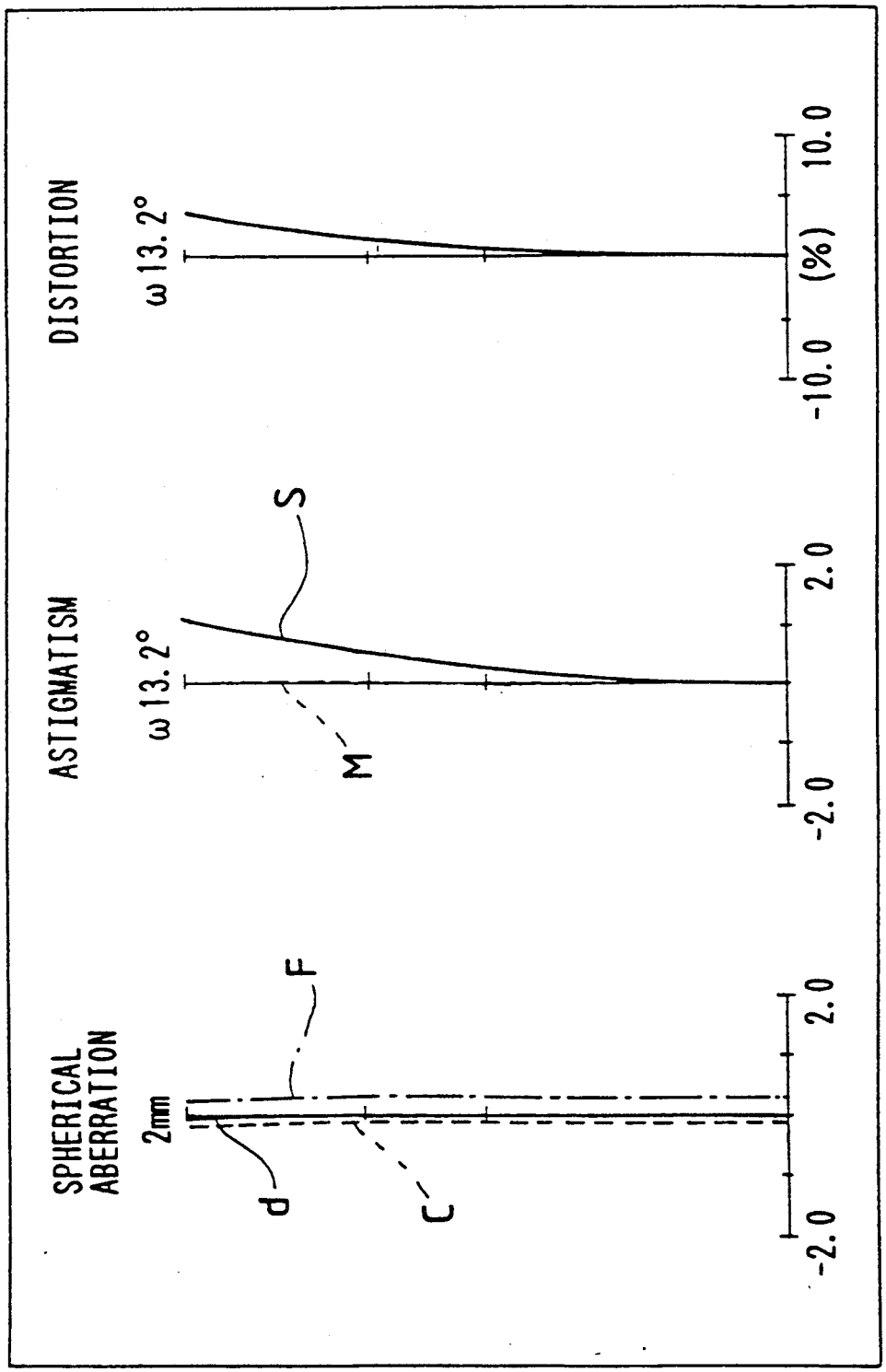
Figure 18:
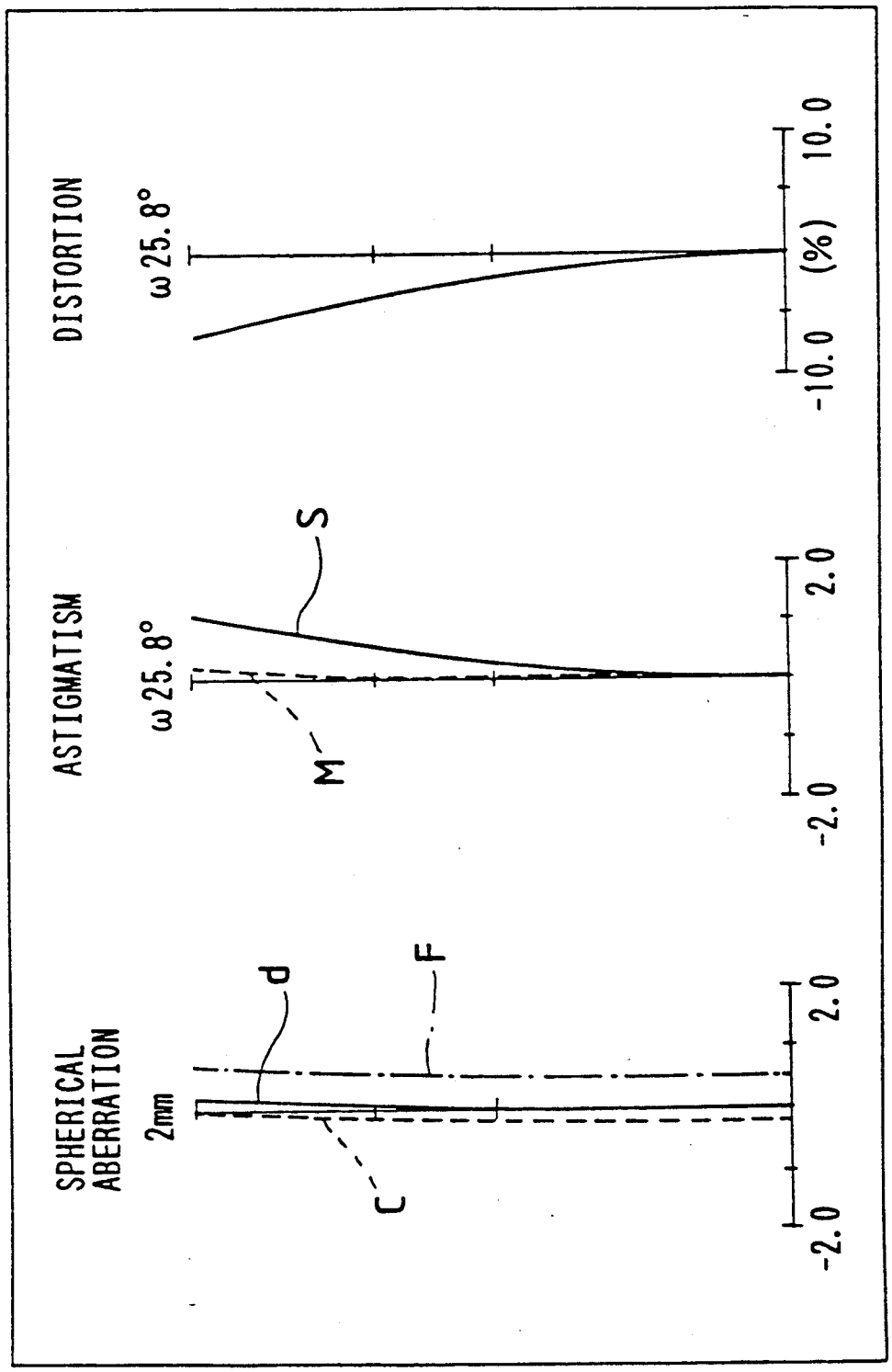
FIG. 18, FIG. 19 and FIG. 20 show graphs illustrating aberration characteristics at the wide position, intermediate magnification and tele position of the Embodiment 5 of the present invention.
Figure 19:
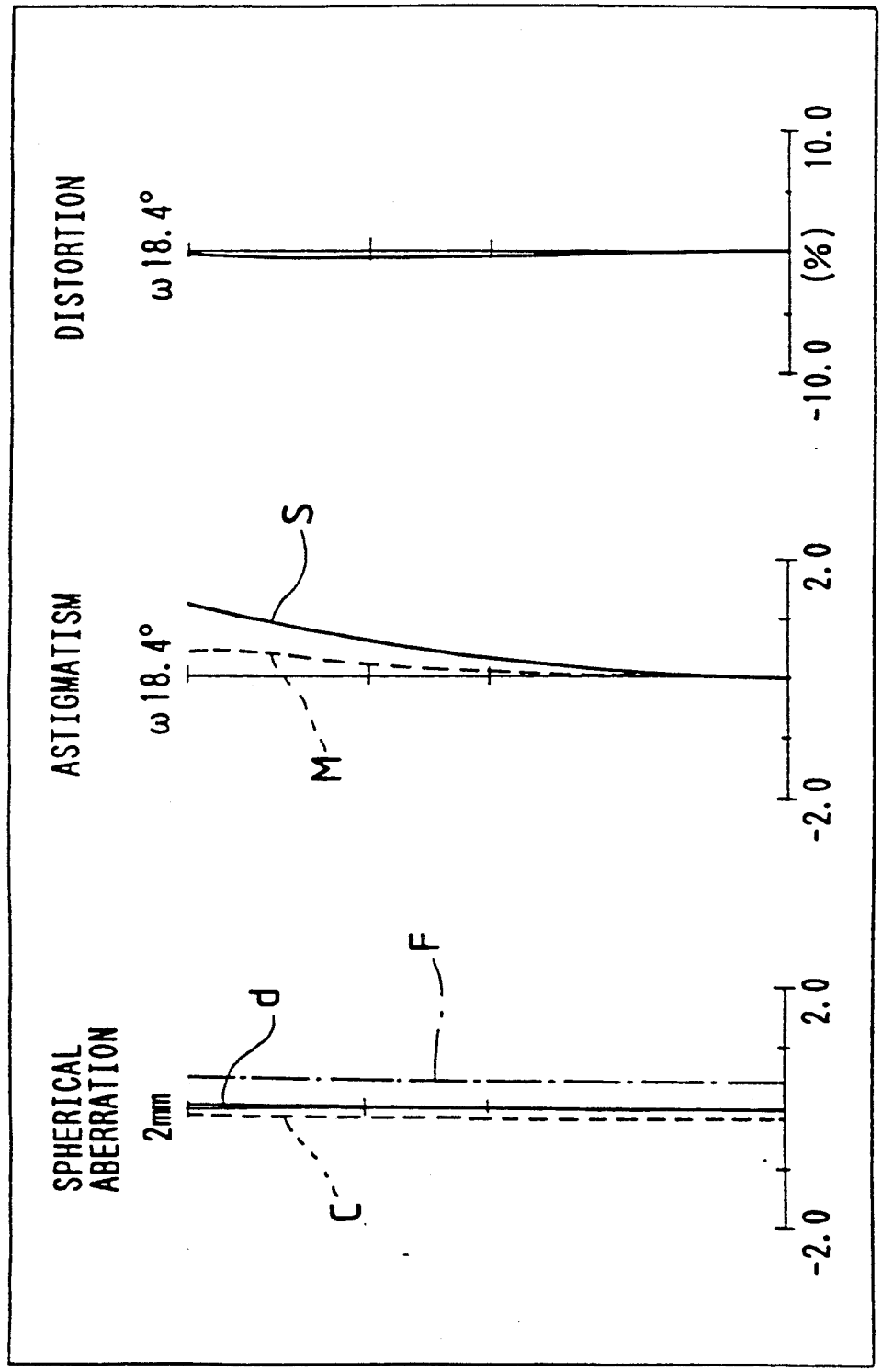
Figure 20:
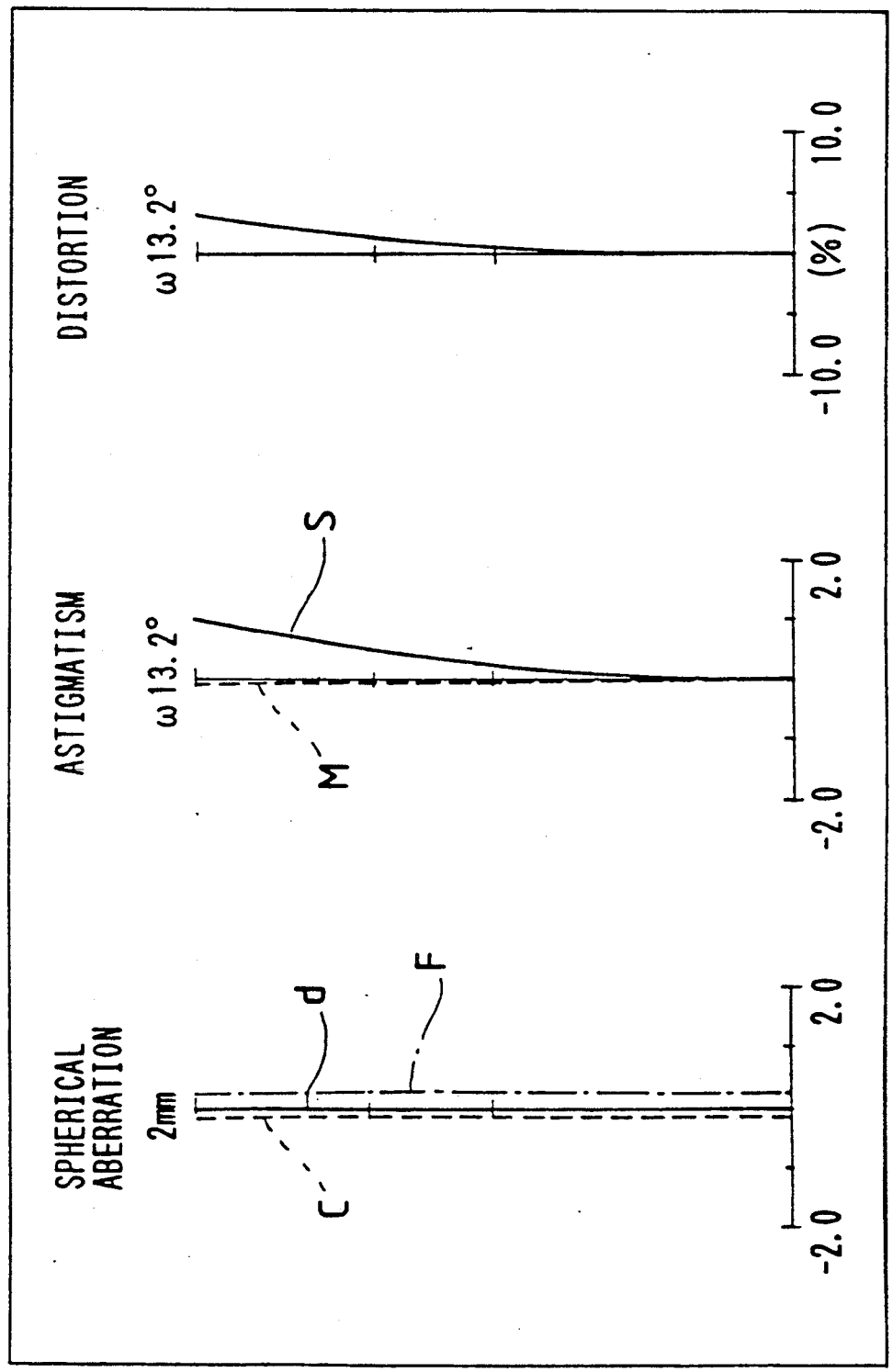
Figure 21:
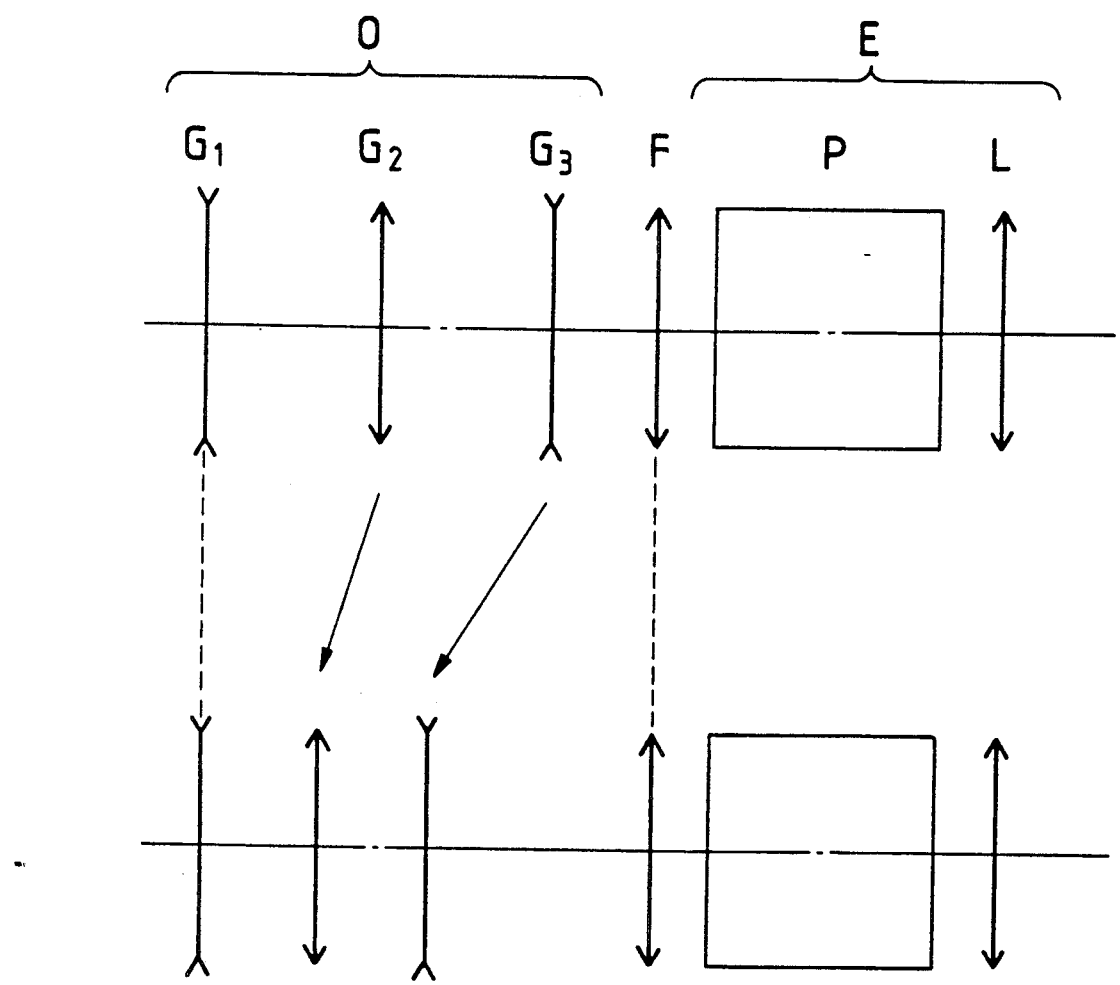
FIG. 21 shows a diagram illustrating the conception of the variable magnification viewfinder according to the present invention.

Now, the present invention will be described in more detail below with reference to the preferred embodiments illustrated in the accompanying drawings and given in the form of the following numerical data:

EMBODIMENT 1 magnification = 0.41 ~ 0.76
field angle (2ω) = 51.6° ~ 26.4°

| | | |
|---|---|---|
| $r_1 = -16.4443$ (aspherical surface) | | |
| $d_1 = 1.0000$ | $n_1 = 1.58362$ | $\nu_1 = 30.37$ |
| $r_2 = 128.2557$ | | |
| $d_2 = D_1$ (variable) | | |
| $r_3 = 7.6560$ | | |
| $d_3 = 5.2230$ | $n_2 = 1.49260$ | $\nu_2 = 58.02$ |
| $r_4 = -13.7998$ (aspherical surface) | | |
| $d_4 = D_2$ (variable) | | |
| $r_5 = -36.5906$ | | |
| $d_5 = 1.0000$ | $n_3 = 1.58362$ | $\nu_3 = 30.37$ |
| $r_6 = 71.2092$ (aspherical surface) | | |
| $d_6 = D_3$ (variable) | | |
| $r_7 = 13.6359$ | | |
| $d_7 = 2.9000$ | $n_4 = 1.49260$ | $\nu_4 = 58.02$ |
| $r_8 = \infty$ | | |
| $d_8 = 1.0000$ | | |
| $r_9 = 30.7824$ | | |
| $d_9 = 39.9000$ | $n_5 = 1.49260$ | $\nu_5 = 58.02$ |
| $r_{10} = \infty$ | | |
| $d_{10} = 0.8200$ | | |
| $r_{11} = 20.3520$ | | |
| $d_{11} = 2.5000$ | $n_6 = 1.49260$ | $\nu_6 = 58.02$ |
| $r_{12} = -43.4091$ (aspherical surface) | | |
| $d_{12} = 13.5000$ | | |

-continued r₁₃ (eye point)

|  | W | S | T |
|---|---|---|---|
| D₁ | 9.116 | 5.290 | 1.0 |
| D₂ | 5.667 | 2.175 | 1.0 |
| D₃ | 5.094 | 12.413 | 17.868 | aspherical surface coefficient (1st surface)
$A_1 = 0, B_1 = 0.30788 \times 10^{-4}$
$C_1 = -0.40427 \times 10^{-4}, D_1 = 0.62311 \times 10^{-5}$
(4th surface)
$A_4 = 0, B_4 = 0.65521 \times 10^{-3}$
$C_4 = 0.58398 \times 10^{-5}, D_4 = 0.10530 \times 10^{-6}$
(6th surface)
$A_6 = 0, B_6 = 0.86696 \times 10^{-5}$
$C_6 = -0.19119 \times 10^{-6}, D_6 = 0.35113 \times 10^{-6}$
(12th surface)
$A_{12} = 0, B_{12} = 0.43888 \times 10^{-4}$
$C_{12} = -0.15059 \times 10^{-5}, D_{12} = 0.33661 \times 10^{-7}$
$|f_1/f_W| = 1.90, f_2/f_W = 0.83$
$|\beta_{2W} \cdot \beta_{3W}| = 0.53$

EMBODIMENT 2 magnification = 0.41~0.77
field angle (2ω) = 51.2°~26.4°

$r_1 = -24.5704$ (aspherical surface)
  $d_1 = 1.0000$    $n_1 = 1.58362$    $\nu_1 = 30.37$
$r_2 = 287.6149$
  $d_2 = D_1$ (variable)
$r_3 = 7.6144$
  $d_3 = 6.7546$    $n_2 = 1.49260$    $\nu_2 = 58.02$
$r_4 = -8.5293$ (aspherical surface)
  $d_4 = D_2$ (variable)
$r_5 = -10.3860$
  $d_5 = 1.0000$    $n_3 = 1.58362$    $\nu_3 = 30.37$
$r_6 = 294.3148$ (aspherical surface)
  $d_6 = D_3$ (variable)
$r_7 = 11.5522$
  $d_7 = 2.8000$    $n_4 = 1.49260$    $\nu_4 = 58.02$
$r_8 = \infty$
  $d_8 = 1.0000$
$r_9 = 31.6330$
  $d_9 = 34.6400$    $n_5 = 1.49260$    $\nu_5 = 58.02$
$r_{10} = \infty$
  $d_{10} = 0.4100$
$r_{11} = 19.0038$
  $d_{11} = 2.5000$    $n_6 = 1.49260$    $\nu_6 = 58.02$
$r_{12} = -31.8279$ (aspherical surface)
  $d_{12} = 13.5000$
$r_{13}$ (eye point)

|  | W | S | T |
|---|---|---|---|
| D₁ | 8.368 | 5.327 | 1.0 |
| D₂ | 5.086 | 2.576 | 1.0 |
| D₃ | 1.0 | 6.541 | 12.451 | aspherical surface coefficient (1st surface)
$A_1 = 0, B_1 = -0.29314 \times 10^{-4}$
$C_1 = -0.65992 \times 10^{-4}, D_1 = 0.10070 \times 10^{-4}$
(4th surface)
$A_4 = 0, B_4 = 0.86082 \times 10^{-3}$
$C_4 = 0.93316 \times 10^{-5}, D_4 = 0.21507 \times 10^{-6}$
(6th surface)
$A_6 = 0, B_6 = -0.17827 \times 10^{-3}$
$C_6 = -0.41289 \times 10^{-5}, D_6 = 0.32563 \times 10^{-6}$
(12th surface)
$A_{12} = 0, B_{12} = 0.59684 \times 10^{-4}$
$C_{12} = -0.16497 \times 10^{-5}, D_{12} = 0.36267 \times 10^{-7}$
$|f_1/f_W| = 3.34, f_2/f_W = 0.82$
$|\beta_{2W} \cdot \beta_{3W}| = 0.30$

EMBODIMENT 3 magnification = 0.41~0.77
field angle (2ω) = 51.2°~26.6°

$r_1 = -24.4527$
  $d_1 = 1.0000$    $n_1 = 1.58362$    $\nu_1 = 30.37$
$r_2 = 110.4223$
  $d_2 = D_1$ (variable)
$r_3 = 7.6585$
  $d_3 = 6.9033$    $n_2 = 1.49260$    $\nu_2 = 58.02$
$r_4 = -8.7306$ (aspherical surface)
  $d_4 = D_2$ (variable)
$r_5 = -9.1882$
  $d_5 = 1.0000$    $n_3 = 1.58362$    $\nu_3 = 30.37$
$r_6 = -44.4065$ (aspherical surface)
  $d_6 = D_3$ (variable)
$r_7 = 12.7696$
  $d_7 = 2.7000$    $n_4 = 1.49260$    $\nu_4 = 58.02$
$r_8 = \infty$
  $d_8 = 1.0000$
$r_9 = 31.6330$
  $d_9 = 34.6400$    $n_5 = 1.49260$    $\nu_5 = 58.02$
$r_{10} = \infty$
  $d_{10} = 0.4100$
$r_{11} = 19.0038$
  $d_{11} = 2.5000$    $n_6 = 1.49260$    $\nu_6 = 58.02$
$r_{12} = -31.8279$ (aspherical surface)
  $d_{12} = 13.5000$
$r_{13}$ (eye point)

|  | W | S | T |
|---|---|---|---|
| D₁ | 8.379 | 5.292 | 1.0 |
| D₂ | 5.520 | 2.684 | 1.0 |
| D₃ | 1.0 | 6.920 | 12.890 | aspherical surface coefficient (4th surface)
$A_4 = 0, B_4 = 0.79247 \times 10^{-3}$
$C_4 = 0.10034 \times 10^{-4}, D_4 = 0.21957 \times 10^{-6}$
(6th surface)
$A_6 = 0, B_6 = -0.79807 \times 10^{-4}$
$C_6 = -0.12716 \times 10^{-4}, D_6 = 0.43315 \times 10^{-6}$
(12th surface)
$A_{12} = 0, B_{12} = 0.59684 \times 10^{-4}$
$C_{12} = -0.16497 \times 10^{-5}, D_{12} = 0.36267 \times 10^{-7}$
$|f_1/f_W| = 3.00, f_2/f_W = 0.84$
$|\beta_{2W} \cdot \beta_{3W}| = 0.33$

EMBODIMENT 4 magnification = 0.41~0.77
field angle (2ω) = 51.6°~26.4°

$r_1 = -18.0379$ (aspherical surface)
  $d_1 = 1.0000$    $n_1 = 1.58362$    $\nu_1 = 30.37$
$r_2 = 34.8796$
  $d_2 = D_1$ (variable)
$r_3 = 10.0057$ (aspherical surface)
  $d_3 = 3.47600$    $n_2 = 1.49260$    $\nu_2 = 58.02$
$r_4 = -9.2230$
  $d_4 = D_2$ (variable)
$r_5 = 18.7127$
  $d_5 = 1.0000$    $n_3 = 1.58362$    $\nu_3 = 30.37$
$r_6 = 12.1769$ (aspherical surface)
  $d_6 = D_3$ (variable)
$r_7 = 10.7107$
  $d_7 = 2.8000$    $n_4 = 1.49260$    $\nu_4 = 58.02$
$r_8 = \infty$
  $d_8 = 1.0000$
$r_9 = 31.6330$
  $d_9 = 34.6400$    $n_5 = 1.49260$    $\nu_5 = 58.02$
$r_{10} = \infty$
  $d_{10} = 0.4100$
$r_{11} = 19.0038$
  $d_{11} = 2.5000$    $n_6 = 1.49260$    $\nu_6 = 58.02$
$r_{12} = -31.8279$ (aspherical surface)
  $d_{12} = 13.5000$
$r_{13}$ (eye point)

-continued

| | W | S | T |
|---|---|---|---|
| $D_1$ | 8.031 | 4.707 | 1.0 |
| $D_2$ | 7.193 | 1.997 | 1.0 |
| $D_3$ | 4.0 | 12.525 | 17.214 | aspherical surface coefficient (1st surface)
$A_1 = 0, B_1 = -0.36915 \times 10^{-4}$
$C_1 = -0.13324 \times 10^{-4}, D_1 = 0.51691 \times 10^{-6}$
(3rd surface)
$A_3 = 0, B_3 = -0.55202 \times 10^{-3}$
$C_3 = 0.39591 \times 10^{-5}, D_3 = -0.22267 \times 10^{-6}$
(6th surface)
$A_6 = 0, B_6 = -0.41369 \times 10^{-4}$
$C_6 = 0.23713 \times 10^{-4}, D_6 = -0.58635 \times 10^{-6}$
(12th surface)
$A_{12} = 0, B_{12} = 0.59684 \times 10^{-4}$
$C_{12} = -0.16497 \times 10^{-5}, D_{12} = 0.36267 \times 10^{-7}$
$|f_1/f_W| = 1.73, f_2/f_W = 0.88$
$|\beta_{2W} \cdot \beta_{3W}| = 0.58$

EMBODIMENT 5 magnification = 0.41~0.77
field angle (2ω) = 51.6°~26.4°

$r_1 = -14.8327$ (aspherical surface)
 $d_1 = 1.0000$     $n_1 = 1.58362$   $\nu_1 = 30.37$
$r_2 = 37.5031$
 $d_2 = D_1$ (variable)
$r_3 = 8.4970$ (aspherical surface)
 $d_3 = 3.2732$     $n_2 = 1.49260$   $\nu_2 = 58.02$
$r_4 = -8.8330$
 $d_4 = 0.2000$
$r_5 = -120.6533$
 $d_5 = 1.0000$     $n_3 = 1.49260$   $\nu_3 = 58.02$
$r_6 = 103.0671$
 $d_6 = D_2$ (variable)
$r_7 = -10.5140$
 $d_7 = 1.0000$     $n_4 = 1.58362$   $\nu_4 = 30.37$
$r_8 = -13.9068$ (aspherical surface)
 $d_8 = D_3$ (variable)
$r_9 = 10.6502$
 $d_9 = 2.8000$     $n_5 = 1.49260$   $\nu_5 = 58.02$
$r_{10} = \infty$
 $d_{10} = 1.0000$
$r_{11} = 31.6330$
 $d_{11} = 34.6400$  $n_6 = 1.49260$   $\nu_6 = 58.02$
$r_{12} = \infty$
 $d_{12} = 0.4100$
$r_{13} = 19.0038$
 $d_{13} = 2.5000$   $n_7 = 1.49260$   $\nu_7 = 58.02$
$r_{14} = -31.8279$ (aspherical surface)
 $d_{14} = 13.5000$
$r_{15}$ (eye point)

| | W | S | T |
|---|---|---|---|
| $D_1$ | 7.958 | 4.466 | 1.0 |
| $D_2$ | 6.772 | 2.650 | 3.0 |
| $D_3$ | 4.0 | 11.606 | 14.719 | aspherical surface coefficient (1st surface)
$A_1 = 0, B_1 = 0.97742 \times 10^{-4}$
$C_1 = -0.19367 \times 10^{-4}, D_1 = 0.86329 \times 10^{-6}$
(3rd surface)
$A_3 = 0, B_3 = -0.69052 \times 10^{-3}$
$C_3 = 0.72214 \times 10^{-5}, D_3 = -0.94792 \times 10^{-6}$
(8th surface)
$A_8 = 0, B_8 = 0.86671 \times 10^{-4}$
$C_8 = 0.18992 \times 10^{-4}, D_8 = -0.59108 \times 10^{-6}$
(14th surface)
$A_{14} = 0, B_{14} = 0.59684 \times 10^{-4}$
$C_{14} = -0.16497 \times 10^{-5}, D_{14} = 0.36267 \times 10^{-7}$
$|f_1/f_W| = 1.54, f_2/f_W = 0.86$
$|\beta_{2W} \cdot \beta_{3W}| = 0.65$ wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abbe's numbers of the respective lens elements.

In each of the embodiments described above, the second lens unit $G_2$ comprises at least one aspherical surface which has positive refractive power that progressively weakens as the surface portions are farther from the optical axis in the radial direction, and the third lens unit $G_3$ also comprises at least one aspherical surface which has positive refractive power that progressively weakens as the surface portions are farther from the optical axis in the radial direction.

In each of the objective lens systems preferred as the Embodiments 1 through 4, the first lens unit is composed of a negative lens element, the second lens unit is composed of a positive lens element and the third lens unit is composed of a negative lens element.

Further, in the objective lens system preferred as the Embodiment 5, the first lens unit is composed of a negative lens element, the second lens unit is composed of a positive lens element and a negative lens element, and the third lens unit is composed of a negative lens element.

Furthermore, each of the Embodiments 1, 4 and 5 adopts, in the first lens unit, an aspherical surface which has negative refractive power progressively weakened in the radial direction as the surface portions are farther from the optical axis. In each of the Embodiments 2 and 3, the first lens unit comprises an aspherical surface which has negative refractive power progressively weakened in the radial direction as the surface portions are farther from the optical axis.

Moreover, each of the Embodiment 1 through 5 adopts, in the eyepiece lens system, an aspherical surface which has positive refractive power progressively weakened in the radial direction as the surface portions are farther from the optical axis.

When the direction of the optical axis is taken as the z axis and the direction perpendicular to the optical axis is taken as the y axis, shapes of the asphericals surface are expressed by the following formula:

$$z = \frac{y^2}{r + \sqrt{r^2 - y^2}} + Ay^2 + By^4 + Cy^6 + Dy^8$$

wherein the reference symbol r represents the radius of curvature on the aspherical surface as measured in the vicinity of the optical axis, and the reference symbols A, B, C and D designate the aspherical surface coefficients.

In addition, all the lens elements and the optical elements may be made of glass materials when permissible practically though from the viewpoint of manufacturing these members are fabricated from plastic materials in the embodiments described above.

The Keplerian type variable magnification viewfinder according to the present invention has a variable magnification ratio on the order of 2, a compact design and favorably corrects aberrations, and it can be manufactured at a low cost.

I claim:

1. A variable magnification viewfinder comprising, in order from the object side:
   an objective lens system having a positive refractive power for forming an image of an object;
   a field lens component having a positive refractive power; and
   an eyepiece lens system having a positive refractive power for permitting observation of the image formed by said objective lens system;
   wherein said objective lens system comprises a first lens unit having a negative refractive power, a second lens unit having a positive refractive power and a third lens unit having a negative refractive power; and
   wherein said variable magnification viewfinder performs variation of magnification and correction of diopter by displacing said second lens unit and said third lens unit along the optical axis so as to vary an airspace reserved between said lens units with said first lens unit kept fixed on the optical axis.

2. A variable magnification viewfinder according to claim 1 wherein said second lens unit comprises an aspherical surface having positive refractive power progressively weakened in the radial direction as the surface portions are farther from the optical axis and said third lens unit comprises an aspherical surface having positive refractive power progressively weakened in the radial direction as the surface portions are farther from the optical axis.

3. A variable magnification viewfinder according to claim 2 satisfying the following conditions (1) through (3):

| | |
|---|---|
| (1) | $1.0 < |f_1/f_W| < 5.0$ |
| (2) | $0.6 < f_2/f_W < 1.2$ |
| (3) | $0.2 < |\beta_{2W} \cdot \beta_{3W}| < 1.0$ | wherein the reference symbols $f_1$ and $f_2$ represent the focal lengths of said first lens unit and said second lens unit respectively, the reference symbol $f_W$ designates the focal length of said objective lens system at the wide position, and the reference symbols $\beta_{2W}$ and $\beta_{3W}$ denote the imaging magnifications of said second lens unit and said third lens units respectively at the wide position.

4. A variable magnification viewfinder according to claim 3 wherein said eyepiece lens system comprises an aspherical surface having positive refractive power progressively weakened in the radial direction as the surface portions are farther from the optical axis.

5. A variable magnification viewfinder according to claim 3 wherein said first lens unit consists of a single positive lens element, said second lens unit consists of a single positive lens element and said third lens unit consists of a single negative lens element.

6. A variable magnification viewfinder according to claim 3 wherein said first lens unit consists of a single negative lens element, said second lens unit consists of a positive lens element and a negative lens element, and said third lens unit consists of a single negative lens element.

7. A variable magnification viewfinder according to claim 1, wherein said objective lens system forms said image proximate said field lens component.

* * * * *